United States Patent
Prichard

(10) Patent No.: US 12,005,504 B2
(45) Date of Patent: Jun. 11, 2024

(54) METHOD FOR FABRICATING A THREE-DIMENSIONAL METAL PART USING A CONFORMABLE FUGITIVE MATERIAL

(71) Applicant: Kennametal Inc., Latrobe, PA (US)

(72) Inventor: Paul D. Prichard, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/406,698

(22) Filed: Aug. 19, 2021

(65) Prior Publication Data

US 2022/0055103 A1 Feb. 24, 2022

Related U.S. Application Data

(60) Provisional application No. 63/069,460, filed on Aug. 24, 2020.

(51) Int. Cl.
*B22F 10/66* (2021.01)
*B22F 3/04* (2006.01)
(Continued)

(52) U.S. Cl.
CPC ............. *B22F 3/04* (2013.01); *B22F 10/14* (2021.01); *B22F 10/60* (2021.01); *B22F 10/66* (2021.01); *B33Y 10/00* (2014.12); *B33Y 40/20* (2020.01)

(58) Field of Classification Search
CPC ...................................................... B22F 10/66
See application file for complete search history.

(56) References Cited

U.S. PATENT DOCUMENTS

| 5,076,869 A | * | 12/1991 | Bourell | G05B 19/41 |
| | | | | 219/121.85 |
| 8,628,821 B2 | * | 1/2014 | Wang | B26B 9/00 |
| | | | | 427/209 |

(Continued)

FOREIGN PATENT DOCUMENTS

| CN | 108480643 A | 9/2018 |
| CN | 109530695 A | 3/2019 |

(Continued)

OTHER PUBLICATIONS

Price, "Cold Isostatic Pressing," ASM Handbook, vol. 7, Powder Metallurgy P. Samal and J. Newkirk, editors, 2015, pp. 255-259 (Year: 2015).*

(Continued)

*Primary Examiner* — Christopher S Kessler
(74) *Attorney, Agent, or Firm* — Larry R. Meenan

(57) ABSTRACT

The present invention is directed towards a method for fabricating a three-dimensional metal, ceramic, and/or cermet part, the method comprising forming the three-dimensional metal, ceramic, and/or cermet part by an additive manufacturing technique; encapsulating the three-dimensional metal, ceramic, and/or cermet part in a conformable fugitive material to form an encapsulated three-dimensional metal, ceramic, and/or cermet part; and cold isostatic pressing the encapsulated three-dimensional metal, ceramic, and/or cermet part with pressurized incompressible fluid that contacts the conformable fugitive material. Also disclosed are three-dimensional metal, ceramic, and/or cermet parts fabricated according to said method.

19 Claims, 3 Drawing Sheets

(51) Int. Cl.
 *B22F 10/14* (2021.01)
 *B22F 10/60* (2021.01)
 *B33Y 10/00* (2015.01)
 *B33Y 40/20* (2020.01)

(56) References Cited

U.S. PATENT DOCUMENTS

| | | | |
|---|---|---|---|
| 10,099,267 | B2 | 10/2018 | Stawovy |
| 10,105,671 | B2 | 10/2018 | Aimone et al. |
| 10,329,848 | B2 | 6/2019 | Kasonde et al. |
| 10,458,001 | B2 | 10/2019 | Smarsly et al. |
| 10,576,542 | B2 | 3/2020 | Holcomb et al. |
| 10,668,566 | B2 | 6/2020 | Smathers et al. |
| 10,716,648 | B2 | 7/2020 | Zandinejad et al. |
| 10,926,480 | B2 | 2/2021 | Yousefiani et al. |
| 10,933,558 | B2 | 3/2021 | Depka et al. |
| 11,097,348 | B2 | 8/2021 | Dozier et al. |
| 11,111,184 | B2 | 9/2021 | Wang et al. |
| 11,135,643 | B2 | 10/2021 | Holcomb et al. |
| 11,179,780 | B2 | 11/2021 | Stawovy et al. |
| 2016/0158843 | A1* | 6/2016 | Yolton ............ B22F 3/15 419/6 |
| 2017/0056138 | A1 | 3/2017 | Zandinejad et al. |
| 2018/0141275 | A1 | 5/2018 | Patel et al. |
| 2018/0142331 | A1 | 5/2018 | Pittari, III et al. |
| 2018/0318922 | A1 | 11/2018 | Valls Anglés |
| 2019/0084048 | A1 | 3/2019 | Ivanov et al. |
| 2020/0016656 | A1* | 1/2020 | Sheinman ............ B22F 10/10 |
| 2020/0063242 | A1 | 2/2020 | Valls Anglés |
| 2020/0070246 | A1 | 3/2020 | Sheinman et al. |
| 2021/0146434 | A1* | 5/2021 | Shuck ............ B30B 11/001 |

FOREIGN PATENT DOCUMENTS

| | | |
|---|---|---|
| CN | 110655405 A | 1/2020 |
| DE | 102013104222 A1 | 10/2014 |
| EP | 2389277 B1 | 4/2013 |
| WO | 2018173048 A1 | 9/2018 |
| WO | 2018173050 A1 | 9/2018 |
| WO | WO2018173048 A1 | 9/2018 |
| WO | WO2018173050 A1 | 9/2018 |
| WO | 2019210285 A2 | 10/2019 |

OTHER PUBLICATIONS

W. Sun, et al., Freeform fabrication of Ti3SiC2 powder-based structures Part I—Integrated fabrication Process., Journal of Materials Processing Technology 127 (2002), pp. 343-351, Philadelphia, PA.

Carrijo M. M. M., et al., Fabrication of Ti3SiC2-based composites via three-dimensional printing: Influence of processing on the final properties, Ceramics International 24 (2016) pp. 9557-9564.

Jun. 29, 2023 Foreign Office Action Chinese Application No. CN202110967133.6, 2 Pages.

Apr. 15, 2024 Foreign Office Action German Application No. DE202110121859.4, P19-06441-DE-NP[2], 14 pages.

Samal, P., et al., "Full-density Consolidation Methods," In: ASM Handbook: vol. 7: Powder Metallurgy, 2015, S.251-291.

* cited by examiner

METHOD FOR FABRICATING A THREE-DIMENSIONAL METAL PART USING A CONFORMABLE FUGITIVE MATERIAL

CROSS-REFERENCE TO RELATED APPLICATIONS

This application claims the benefit of U.S. Provisional Patent Application Ser. No. 63/069,460, filed on Aug. 24, 2020, incorporated herein by reference.

FIELD OF THE INVENTION

The present invention relates to a method for fabricating a three-dimensional metal part, and more particularly relates to three-dimensional metal, ceramic, or cermet parts fabricated by an additive manufacturing process and cold isostatic pressing.

BACKGROUND INFORMATION

Additive manufacturing offers an efficient and cost-effective alternative to traditional article fabrication techniques based on molding processes. With additive manufacturing, the significant time and expense of mold and/or die construction and other tooling can be obviated. Further, additive manufacturing techniques make an efficient use of materials by permitting recycling in the process and precluding the requirement of lubricants and coolant. Most importantly, additive manufacturing enables significant freedom in article design. Articles having highly complex shapes can be produced without significant expense allowing the development and evaluation of a series of article designs prior to final design selection.

It has been recently discovered that complex geometries made by an additive manufacturing technique can be processed by cold isostatic processing to increase the green density of the part. This is accomplished by placing parts in an elastomeric bag and filing the bag with an flowable granular media which transmits the externally applied isostatic pressure to the component. The bagging process is time consuming, requires expensive granular media, and can result in damage to the part during the bagging process. An improved method of increasing the green density of a part made by additive manufacturing techniques is desired.

SUMMARY OF THE INVENTION

Disclosed herein is a method for fabricating a three-dimensional metal, ceramic, and/or cermet part, the method comprising forming the three-dimensional metal, ceramic, and/or cermet part by an additive manufacturing technique; encapsulating the three-dimensional metal, ceramic, and/or cermet part in a conformable fugitive material to form an encapsulated three-dimensional metal, ceramic, and/or cermet part; and cold isostatic pressing the encapsulated three-dimensional metal, ceramic, and/or cermet part with pressurized incompressible fluid that contacts the conformable fugitive material.

Also disclosed herein is a three-dimensional metal, ceramic, and/or cermet part fabricated by the method of disclosed herein.

DETAILED DESCRIPTION OF THE INVENTION

Figure 1:
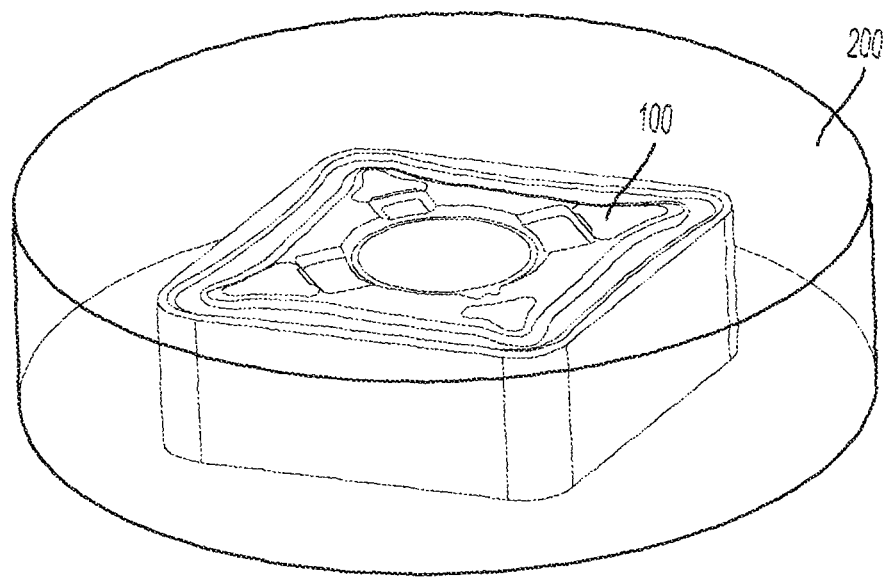
FIG. 1 is an isometric view of an encapsulated three-dimensional cutting insert cast in a conformable fugitive material.

As stated above, the present invention is directed to a method for fabricating a three-dimensional metal, ceramic, or cermet part 100, the method comprising forming the three-dimensional metal, ceramic, or cermet part 100 by an additive manufacturing technique; encapsulating the three-dimensional metal, ceramic, or cermet part 100 in a conformable fugitive material 200 to form an encapsulated three-dimensional metal, ceramic, or cermet part 100; and cold isostatic pressing the encapsulated three-dimensional metal, ceramic, or cermet part 100 with pressurized fluid that contacts the conformable fugitive material 200.

The method of the present invention comprises forming a three-dimensional part 100 by an additive manufacturing technique. The term "additive manufacturing technique" refers to processes for forming a three-dimensional object by successively adding material to the object layer by layer. The layer-by-layer, stratified construction makes it possible to easily form undercuts and complex geometrical structures, which, with previous conventional manufacturing methods, was not possible or required considerable effort and expense. The three-dimensional object may be based upon a 3D model of the component object that may be electronically designed as part 100 of an electronic file having the design parameters. Additive manufacturing may also be referred to as 3D printing. The additive manufacturing technique of the present invention comprises a process for forming a metal, ceramic, or cermet powder and an optional binder into the three-dimensional metal, ceramic, or cermet part 100.

As used herein, the term "metal powder" includes metals, metal alloys, metal carbides, metal nitrides, metal borides, and/or metal carbonitride. The metal may comprise titanium, zirconium, hafnium, vanadium, niobium, tantalum, chromium, molybdenum, tungsten, cobalt, nickel, iron, alloys thereof, such as, for example, steel, stainless steel, tool steel, nickel base superalloy, tungsten carbide, WC—Co hardmetal, or Co—Cr alloys (e.g., Stellite™ alloys).

As used herein, "ceramic powder" includes, but are not limited to, SiAlON, silicon carbide, silicon nitride, whisker reinforced ceramics, alumina, or alumina carbides.

As used herein, "cermet powder" includes composition materials comprising ceramic and metal materials.

The metal, ceramic, or cermet powder is used as a starting material in powder form. The metal powder average particle size is not limited but may be, for example, at least 0.1 μm, such as at least 1 μm, such as at least 10 μm. The metal, ceramic, or cermet powder average particle size may be, for example, no more than 200 μm, such as no more than 100 μm, such as no more than 50 μm. The metal, ceramic, or cermet powder average particle size may be, for example, from 0.1 to 200 μm, such as 1 and 100 μm, such as 10 to 50 μm. The average particle size may be measured by techniques known in the art.

The three-dimensional part 100 may comprise combinations of metal, ceramic, and/or cermet powders.

The binder used as a starting material, if present, may comprise a metal or organic material. Any suitable binder material may be used.

Any additive manufacturing technique operable to form the metal, ceramic, or cermet powder into a green article may be employed. Non-limiting examples of additive manufacturing techniques include binder jetting, directed energy deposition (DED), material extrusion, material jetting, powder bed fusion, sheet lamination, and/or vat photopolymerization. Non-limiting examples of powder bed fusion processes include, for example, selective laser sintering (SLS), selective laser melting (SLM), direct metal laser sintering (DMLS), and electron beam melting (EBM).

As used herein, "binder jetting" refers to the following method of producing a component: selectively jetting droplets of liquid binder onto a bed of powder (e.g., metal, ceramic, and/or cermet powder) based on a 3D model of a component, adhering powder particles into a cross-section, depositing additional powder then binder to form the next layer of the object and repeating this process until the green component is finished. For example, the binder jetting apparatus spreads a layer of the metal, ceramic, and/or cermet powder in a build box, a printhead moves over the powder layer depositing liquid binder according to design parameters for that layer, the layer is dried, the build box is lowered, a new layer of metal, ceramic, and/or cermet powder is spread, and the process is repeated until the green article (body) is completed.

Green bodies formed using additive manufacturing processes, such as printing, can have green densities ranging from 35% to 55%. As discussed below, the CIP process can increase density from 55% to 70% depending on the powder size distribution and applied pressure.

The method of the present invention further comprises encapsulating the three-dimensional metal, ceramic, and/or cermet part 100 in a conformable fugitive material 200 to form an encapsulated three-dimensional metal, ceramic, and/or cermet part 100.

As used herein, the term "conformable fugitive material" refers to a material that conforms to the topography and geometry of the outer surface of the three-dimensional part 100 to prevent contact with the surface, and that is capable of being removed from the three-dimensional part 100.

The conformable fugitive material 200 may comprise any suitable material that is insoluble in the CIP pressurization fluid. For example, the conformable fugitive material 200 may comprise an organic polymeric material. The organic polymeric material may comprise a thermoplastic material, an elastomeric material, or a combination thereof. Non-limiting examples of organic polymeric materials include alkyd polymers, acrylics, polyepoxides, polyamides, polyurethanes, polyureas, polyethers, polyesters, polyolefins, polyalkylenes (e.g., polyethylene, polypropylene), polysaccharides, poly(meth)acrylates, polystyrenes, polyvinyl alcohol, poly(vinyl acetate), polyacrylonitrile, polyimide, polyvinyl butyral, polyvinyl pyrrolidone, poly(vinyl chloride), styrene butadiene rubber, nitrile rubber, silicone rubber, xanthan gum, cellulose acetate, nylon-6, nylon-6,6, polycarbonate, poly(ethylene terephthalate), polyoxymethylene, polysulfone, and polytetrafluoroethylene, among others. The organic polymeric material may also comprise copolymers and/or grafted polymers of such polymeric materials, as well as combinations of polymers. A specific non-limiting example of an organic polymeric material includes paraffin wax.

The properties of these polymers can be suitably modified for conformability the addition of any suitable optional additive materials, such as, for example, fillers, plasticizers, anti-oxidants, biocides, dispersing aids, flow control agents, surfactants, wetting agents, or any combination thereof. Non-limiting examples of plasticizers include ortho-phthalates such as, for example, diisononyl phthalate (DINP), diisodecyl phthalate (DIDP), di(2-propylheptyl) phthalate (DPHP), diisoundecyl-Phthalate (DIUP), di-tridecyl phthalate (DTDP), bis(2-ethylhexyl) phthalate (DEHP), dibutyl phthalate (DBP), diisobutyl phthalate (DLBP), benzyl butyl phthalate (BBP), dipentyl phthalate (DPP), diisopentyl phthalate (DIPP), isopentyl-n-pentyl phthalate (PIPP), diisoheptyl phthalate (DIHP), bis(2-methoxyethyl) phthalate (DMeP), and dicyclohexyl phthalate (DCHP); cyclohexanoates such as, for example, 1,2-cyclohexane di-carboxylic acid di-isononyl ester (DC9CH); terephthalates such as, for example, dioctyl terephthalate (DOTP) and dibutyl terephthalate (DBT); adipates such as, for example, dioctyl adipate (DOA), diisononyl adipate (DINA), and diisodecyl adipate (DIDA); phosphate esters such as, for example, triphenyl phosphate; dibenzoates such as, for example, oxydiethylene dibenzoate (ODEDB) and oxydipropyl dibenzoate (OXPDB); vegetable oils such as, for example, ELO, ESBO, and castor oil; sebacates such as, for example, dimethyl sebacate (DMS) and dibutyl sebacate (DBS); azelates such as, for example, DIDAz; trimellitates such as, for example, tris (2-ethylhexyl) trimellitate (TOTM); citrates such as, for example, acetyl tributyl citrate (ATBC); and benzoates such as, for example, isononyl benzoate (INB) and isodecyl benzoate (IDB), among others.

The conformable fugitive material 200 may be a solid at room temperature (about 23° C.) and atmospheric pressure and should have sufficient mechanical properties, such as elasticity, to avoid significant deformation and/or defects that results in cracking and/or delamination of the conformable fugitive material 200 to expose the surface of the encapsulated three-dimensional part 100 to the pressurized fluid during CIP. For example, the conformable fugitive material 200 may have a Young's modulus of at least 0.1 GPa, such as at least 0.3 GPa, such as at least 0.4 GPa, such as at least 0.7 GPa, such as at least 1 GPa, such as at least 2.5 GPa, such as at least 3 GPa, such as at least 3.5 GPa. The conformable fugitive material 200 may have a Young's modulus of no more than 4 GPa, such as no more than 3.5 GPa, such as no more than 3 GPa, such as no more than 2.5 GPa, such as no more than 2 GPa, such as no more than 1.5 GPa, such as no more than 1 GPa, such as no more than 0.5 GPa. The conformable fugitive material 200 may have a Young's modulus of 0.1 to 4 GPa, such as 0.3 to 3.5 GPa, such as 0.4 to 3 GPa, such as 0.7 to 2.5 GPa, such as 1 to 2 GPa. The tensile modulus may be measured by techniques known the art, such as, for example, ASTM D 638.

The ductility and toughness of the conformable fugitive material 200 must be sufficient to deform and maintain the shape of the component without fracture, cracking or tearing during the CIP process.

Figure 3:
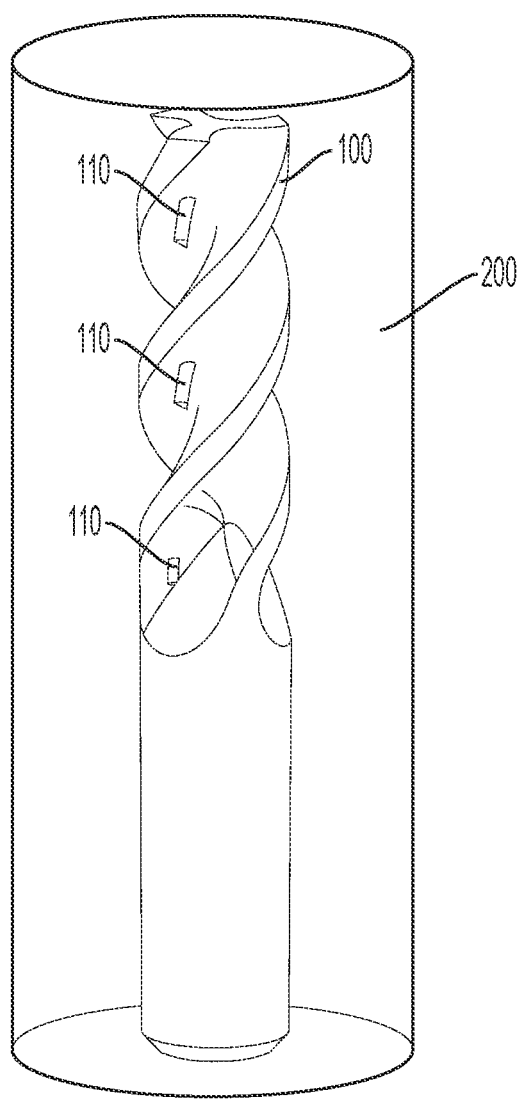
FIG. 3 is an isometric view of an encapsulated three-dimensional endmill cast in a conformable fugitive material.

The conformable fugitive material 200 may be applied to the entire outer surface of the three-dimensional part 100 to form an encapsulated three-dimensional part 100. The conformable fugitive material 200 may be applied by any suitable technique. As shown in FIG. 1, an exemplary encapsulated three-dimensional part 100 (a cutting insert) is cast in a cylindrical mold of the conformable fugitive material 200. As shown in FIG. 3, an exemplary encapsulated three-dimensional part 100 (an endmill with internal cooling passages) is cast in a cylindrical mold of the conformable fugitive material 200.

In a non-limiting example, encapsulating the three-dimensional metal, ceramic, and/or cermet part 100 in a conformable fugitive material 200 may comprise placing the three-dimensional part 100 in a mold and pouring the conformable fugitive material 200 in a Liquid state into the mold to encapsulate the three-dimensional part 100 in the conformable fugitive material 200. The conformable fugitive material 200 may then be allowed to solidify, and the encapsulated three-dimensional part 100 may be removed from the mold (thermally, chemically or mechanically). The mold may be of any suitable shape so long as the entire three-dimensional part 100 fits within the mold volume of the mold and is contacted by the conformable fugitive material 200. For example, the mold may be in the shape of a cube, cuboid, sphere, cylinder, or any other suitable shape. The mold forms a cast of the conformable fugitive material 200 that contains the three-dimensional part 100. In addition, the part 100 may have internal channels/passages which need to be filled. These channels can be filled with the conformable fugitive material 200 to prevent the collapse of the channel during the cold isostatic pressing pressurization.

Figure 2:
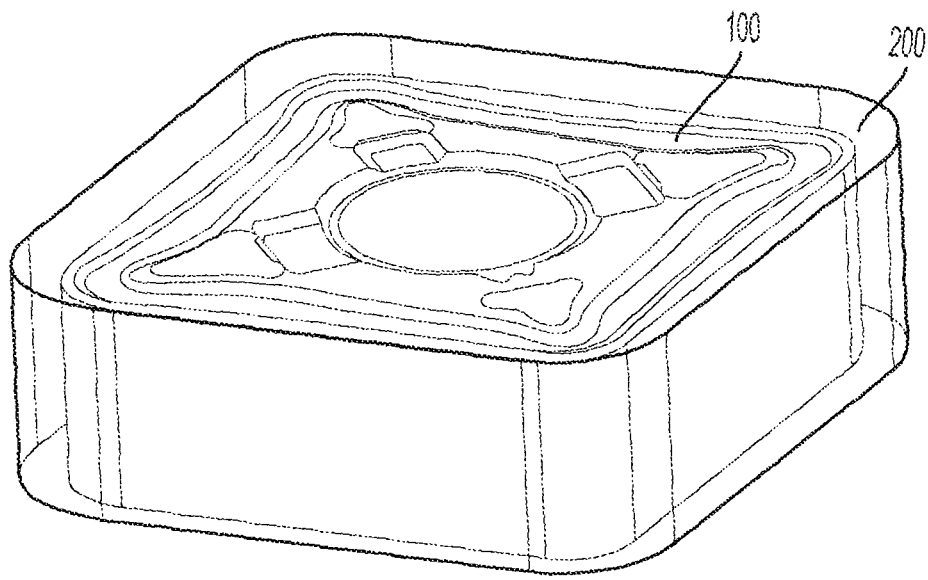
FIG. 2 is an isometric is an isometric view of an encapsulated three-dimensional cutting insert coated in a conformable fugitive material.
Figure 4:
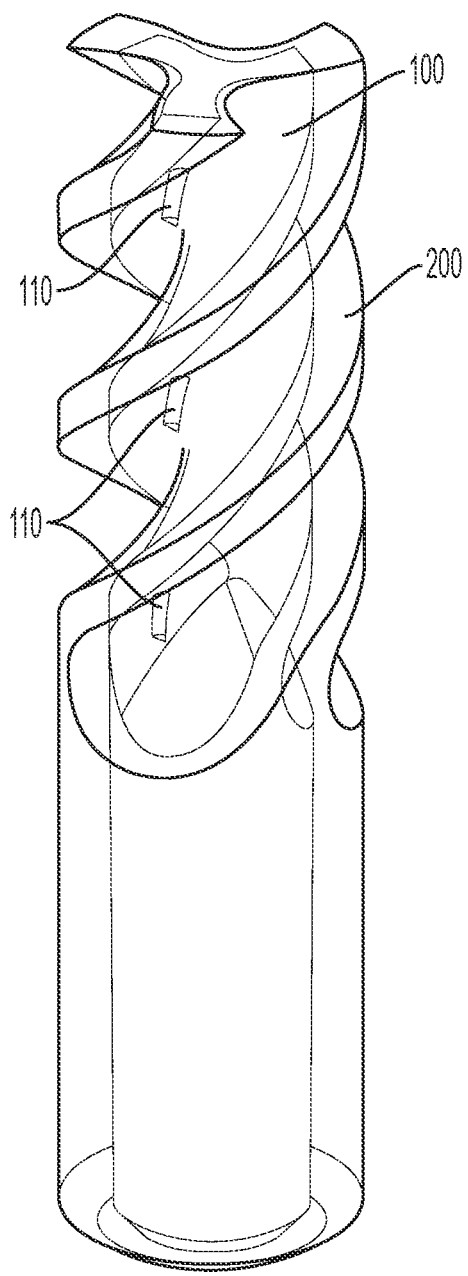
FIG. 4 is an isometric is an isometric view of an encapsulated three-dimensional endmill coated in a conformable fugitive material.

In a non-limiting example, encapsulating the three-dimensional metal, ceramic, and/or cermet part 100 in a conformable fugitive material 200 may comprise applying a coating of the conformable fugitive material 200 in a molten state to the exterior surface of the three-dimensional part 100, wherein the coating encapsulates the three-dimensional part 100. The coating may be applied by any suitable method. As shown in FIG. 2, an exemplary encapsulated three-dimensional part 100 (a cutting insert) coated with the conformable fugitive material 200. As shown in FIG. 4, an exemplary encapsulated three-dimensional part 100 (an endmill with internal cooling passages) coated with the conformable fugitive material 200.

For example, the coating may be applied by conventional techniques such as spraying, brushing, dipping, immersion, or a combination thereof. Additionally, a thin sheet of the conformable fugitive material 200 may be applied to the exterior surface of the three-dimensional metal, ceramic, and/or cermet part 100 and then melted to tightly adhere to the part 100. Further, the coating may be applied in a reduced pressure environment or vacuum. The coating thickness of coatings applied by these techniques is not limited, but may range from, for example, 1 mm to 3 mm. In addition to the exterior surface of the three-dimensional part 100, the part 100 may have internal channels/passages which need to be filled. These channels can be filled with the conformable fugitive material 200 to prevent the collapse of the channel during the cold isostatic pressing pressurization.

In an alternative example, the coating may be applied by physical vapor deposition (PVD). The application of the PVD coating may be accomplished by a vapor deposition process where a vaporization vessel is constructed to heat the conformable fugitive material 200 above its melting point to introduce it as a vapor in the environment. The environment can be inert (e.g., nitrogen or argon) to prevent degradation of the conformable fugitive material 200 molecules. The three-dimensional metal, ceramic, and/or cermet part 100 may be in a portion of the PVD chamber where the temperature and atmospheric pressure is controlled to promote the condensation of the conformable fugitive material 200 uniformly on the part 100 and completely seal the exterior surface. A conformable fugitive material 200 coating is created which encapsulates the part 100. The coating thickness of a coating applied by PVD may typically be less 1 mm. In addition, the part 100 may have internal channels/passages which need to be filled. These channels can be filled with the conformable fugitive material 200 to prevent the collapse of the channel during the cold isostatic pressing pressurization In an alternative example, the coating may be applied by chemical vapor deposition (CVD). The application of the CVD coating may be accomplished by a chemical deposition process, a vacuum deposition method wherein the three-dimensional metal, ceramic, and/or cermet part 100 is exposed to one or more volatile precursors, which react and/or decompose to form the conformable fugitive material 200 on the three-dimensional metal, ceramic, and/or cermet part 100 surface. Volatile by-products may also be produced and may be removed by gas flow through the reaction chamber. A conformable fugitive material 200 coating may be created which encapsulates the part 100. The coating thickness of a coating applied by CVD may typically be less 1 mm. In addition, the part 100 may have internal channels/passages which need to be filled. These channels can be filled with the conformable fugitive material 200 to prevent the collapse of the channel during the cold isostatic pressing pressurization.

The method of the present invention further comprises cold isostatic pressing the encapsulated three-dimensional metal, ceramic, and/or cermet part 100 with pressurized incompressible fluid that contacts the conformable fugitive material 200.

Cold Isostatic pressing is a powder-forming process where packing density takes place under isostatic or near-isostatic pressure conditions. Cold isostatic pressing typically involves filling an elastomeric mold with powder, placing the filled, elastomeric mold into a CIP chamber, and filling the chamber with an incompressible fluid at high pressure to apply an isostatic or pseudo-isostatic force to compress the powder in the mold. The result is the formation of a highly compacted product having a uniform density. A more recent discovery involved placing an already formed green part into an elastomeric bag and filling the bag with a flowable granular media (the "bagging" process), placing the mold into the CIP chamber, and filling the chamber with an incompressible fluid at high pressure to apply an isostatic or pseudo-isostatic force to compress the green part. Specifically, the elastomeric bag and incompressible flowable media transmit the externally applied isostatic pressure of the chamber to the green part. The present invention eliminates the need for the elastomeric bag and the bagging process. Instead, the encapsulated three-dimensional metal, ceramic, and/or cermet part 100 can be placed directly into the chamber where the pressurized fluid contacts the conformable fugitive material 200. The conformable fugitive material 200 allows for transmission of the isostatic or pseudo-isostatic force upon the three-dimensional metal, ceramic, and/or cermet part 100 through the conformable fugitive media. The conformable fugitive media also prevents the fluid from contacting the exterior surface of the three-dimensional part 100 itself.

The cold isostatic press applies pressure to the system using a pressurized incompressible fluid. The pressurized incompressible fluid may comprise water, oil or a water/oil emulsion. The cold isostatic pressing may provide a pressure of 10 ksi to 60 ksi and may increase the green density of the three-dimensional metal, ceramic, and/or cermet part 100 from the range of about 35% to 55% of theoretical density to the range of about 55% to 70% of theoretical density.

The method of the present invention may further comprise removing the conformable fugitive material 200 from the encapsulated three-dimensional metal, ceramic, and/or cermet part 100 after compressing the encapsulated three-dimensional part 100. The conformable fugitive material 200 may be removed by any suitable method. The method for removing the conformable fugitive material 200 may comprise a chemical, thermal, or mechanical process, as well as a combination thereof. For example, removing the conformable fugitive material 200 may comprise heating the encapsulated three-dimensional metal, ceramic, and/or cermet part 100 to a temperature above the melting and/or vaporization point of the conformable fugitive material 200. The conformable fugitive material 200 will undergo physical change into a molten state that can roll or drip off the exterior surface of the three-dimensional part 100. Non-limiting examples of mechanical processes for removing the conformable fugitive material 200 include scraping and sanding. In addition, the conformable fugitive material 200 can be removed from the channels such as by melting the conformable fugitive material 200. The conformable fugitive material 200 removed from the encapsulated three-dimensional part 100 may be collected and used for encapsulating a newly formed three-dimensional part 100 in the conformable fugitive material 200.

The method of the present invention may further comprise sintering the three-dimensional metal, ceramic, and/or cermet part 100. As used herein, "sintering" refers to heating the three-dimensional part 100 above to a temperature above 0.7 $T_m$ (70% of the melting point) of the metal powder to promote sufficient diffusion to eliminate porosity in the solid state or partial liquid state. Sintering may be performed contemporaneously with or after removal of the conformal fugitive material.

The method of the present invention may be used to make any three-dimensional metal, ceramic, and/or cermet part 100. For example, the three-dimensional part 100 may comprise a cutting tool. The cutting tool may comprise, for example, a drill, reamer or endmill. The cutting tool may optionally comprise internal cooling passages that add complexity to the three-dimensional part 100.

Accordingly, the present invention is also directed to a three-dimensional metal, ceramic, and/or cermet part 100 fabricated by the method described above.

Each of the characteristics and examples described above, and combinations thereof, may be said to be encompassed by the present invention. The present invention is thus drawn, without being limited thereto, to the following aspects:

Aspect 1. A method for fabricating a three-dimensional metal, ceramic, and/or cermet part, the method comprising forming the three-dimensional metal, ceramic, and/or cermet part by an additive manufacturing technique; encapsulating the three-dimensional metal, ceramic, and/or cermet part in a conformable fugitive material to form an encapsulated three-dimensional metal, ceramic, and/or cermet part; and cold isostatic pressing the encapsulated three-dimensional metal, ceramic, and/or cermet part with pressurized incompressible fluid that contacts the conformable fugitive material.

Aspect 2. The method of Aspect 1, wherein the additive manufacturing process comprises a process for forming a metal, ceramic, and/or cermet powder and optionally a binder into the three-dimensional metal, ceramic, and/or cermet part.

Aspect 3. The method of any of the preceding Aspects, wherein the additive manufacturing process comprises at least one of binder jetting, directed energy deposition, material extrusion, material jetting, powder bed fusion, sheet lamination, and/or vat photopolymerization.

Aspect 4. The method of any of the preceding Aspects, wherein the conformable fugitive material comprises an organic polymeric material.

Aspect 5. The method of Aspect 4, wherein the organic polymeric material comprises a thermoplastic material.

Aspect 6. The method of Aspect 4, wherein the organic polymeric material comprises an elastomeric material.

Aspect 7. The method of Aspect 4, wherein the organic polymeric material comprises paraffin wax.

Aspect 8. The method of any of the preceding Aspects, wherein encapsulating the three-dimensional metal, ceramic, and/or cermet part in a conformable fugitive material comprises placing the three-dimensional metal, ceramic, and/or cermet part in a mold and pouring the conformable fugitive material in a molten state into the mold to encapsulate the three-dimensional metal, ceramic, and/or cermet part in the conformable fugitive material.

Aspect 9. The method of any of the preceding Aspects 1-7, wherein encapsulating the three-dimensional metal, ceramic, and/or cermet part in a conformable fugitive material comprises applying a coating of the conformable fugitive material in a molten state to the exterior surface of the three-dimensional metal, ceramic, and/or cermet part, wherein the coating encapsulates the three-dimensional metal, ceramic, and/or cermet part.

Aspect 10. The method of Aspect 9, wherein the coating is applied by spraying, brushing, dipping, and/or immersion, and the coating is optionally applied in a reduced pressure environment or vacuum.

Aspect 11. The method of Aspects 9 or 10, wherein the coating has a thickness of 1 mm to 3 mm.

Aspect 12. The method of Aspect 9, wherein the coating is applied by physical vapor deposition.

Aspect 13. The method of Aspect 12, wherein the coating has a thickness of less than 1 mm.

Aspect 14. The method of any of the preceding Aspects, wherein the cold isostatic pressing provides a pressure of 10 ksi to 50 ksi.

Aspect 15. The method of any of the preceding Aspects, wherein the pressurized incompressible fluid comprises water, oil, or a water/oil emulsion.

Aspect 16. The method of any of the preceding Aspects, further comprising removing the conformable fugitive material from the encapsulated three-dimensional metal, ceramic, and/or cermet part after compressing the encapsulated three-dimensional metal, ceramic, and/or cermet part.

Aspect 17. The method of Aspect 16, wherein removing the conformable fugitive material comprises a chemical, thermal, or mechanical process.

Aspect 18. The method of Aspects 16 or 17, wherein removing the conformable fugitive material comprises heating the encapsulated three-dimensional metal, ceramic, and/or cermet part to a temperature above the melting point of the conformable fugitive material.

Aspect 19. The method of Aspects 16 or 17, wherein removing the conformable fugitive material comprises heating the encapsulated three-dimensional metal, ceramic, and/or cermet part to a temperature above the vaporization temperature of the conformable fugitive material.

Aspect 20. The method of any of Aspects 16-19, wherein the conformable fugitive material removed from the encapsulated three-dimensional metal, ceramic, and/or cermet part is collected and used for encapsulating a newly formed three-dimensional metal, ceramic, and/or cermet part in the conformable fugitive material.

Aspect 21. The method of any of the preceding Aspects, further comprising sintering the three-dimensional metal, ceramic, and/or cermet part.

Aspect 22. The method of any of the preceding Aspects, wherein the three-dimensional metal, ceramic, and/or cermet part comprises a metal cutting tool.

Aspect 23. The method of Aspect 22, wherein the metal cutting tool comprises internal cooling passages.

Aspect 24. A three-dimensional metal, ceramic, and/or cermet part fabricated by the method of any of the preceding Aspects.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A method for fabricating a three-dimensional metal, ceramic, and/or cermet part, the method comprising:
   (a) forming the three-dimensional metal, ceramic, and/or cermet part by an additive manufacturing technique;
   (b) encapsulating the three-dimensional metal, ceramic, and/or cermet part in a conformable fugitive material to form an encapsulated three-dimensional metal, ceramic, and/or cermet part, wherein encapsulating the three-dimensional metal, ceramic, and/or cermet part in a conformable fugitive material comprises applying a coating by physical vapor deposition; and
   (c) cold isostatic pressing the encapsulated three-dimensional metal, ceramic, and/or cermet part with pressurized incompressible fluid that contacts the conformable fugitive material.

2. The method of claim 1, wherein the additive manufacturing process comprises a process for forming a metal, ceramic, and/or cermet powder and optionally a binder into the three-dimensional metal, ceramic, and/or cermet part.

3. The method of claim 1, wherein the additive manufacturing process comprises at least one of binder jetting, directed energy deposition, material extrusion, material jetting, powder bed fusion, sheet lamination, and/or vat photopolymerization.

4. The method of claim 1, wherein the conformable fugitive material comprises an organic polymeric material.

5. The method of claim 4, wherein the organic polymeric material comprises a thermoplastic material.

6. The method of claim 4, wherein the organic polymeric material comprises an elastomeric material.

7. The method of claim 4, wherein the organic polymeric material comprises paraffin wax.

8. The method of claim 1, wherein the coating has a thickness of less than 1 mm.

9. The method of claim 1, wherein the cold isostatic pressing provides a pressure of 10 ksi to 50 ksi.

10. The method of claim 1, wherein the pressurized incompressible fluid comprises water, oil, or a water/oil emulsion.

11. The method of claim 1, further comprising removing the conformable fugitive material from the encapsulated three-dimensional metal, ceramic, and/or cermet part after compressing the encapsulated three-dimensional metal, ceramic, and/or cermet part.

12. The method of claim 11, wherein removing the conformable fugitive material comprises a chemical, thermal, or mechanical process.

13. The method of claim 11, wherein removing the conformable fugitive material comprises heating the encapsulated three-dimensional metal, ceramic, and/or cermet part to a temperature above the melting point of the conformable fugitive material.

14. The method of claim 11, wherein removing the conformable fugitive material comprises heating the encapsulated three-dimensional metal, ceramic, and/or cermet part to a temperature above the vaporization temperature of the conformable fugitive material.

15. The method of claim 1, further comprising sintering the three-dimensional metal, ceramic, and/or cermet part.

16. The method of claim 1, wherein the three-dimensional metal, ceramic, and/or cermet part comprises a metal cutting tool.

17. The method of claim 16, wherein the metal cutting tool comprises internal cooling passages.

18. A method for fabricating a three-dimensional metal, ceramic, and/or cermet part, the method comprising:
(a) forming the three-dimensional metal, ceramic, and/or cermet part by an additive manufacturing technique;
(b) encapsulating the three-dimensional metal, ceramic, and/or cermet part in a conformable fugitive material to form an encapsulated three-dimensional metal, ceramic, and/or cermet part, wherein encapsulating the three-dimensional metal, ceramic, and/or cermet part in a conformable fugitive material comprises placing the three-dimensional metal, ceramic, and/or cermet part in a mold and pouring the conformable fugitive material in a molten state into the mold to encapsulate the three-dimensional metal, ceramic, and/or cermet part in the conformable fugitive material; and
(c) cold isostatic pressing the encapsulated three-dimensional metal, ceramic, and/or cermet part with pressurized incompressible fluid that contacts the conformable fugitive material.

19. A method for fabricating a three-dimensional metal, ceramic, and/or cermet part, the method comprising:
(a) forming the three-dimensional metal, ceramic, and/or cermet part by an additive manufacturing technique;
(b) encapsulating the three-dimensional metal, ceramic, and/or cermet part in a conformable fugitive material to form an encapsulated three-dimensional metal, ceramic, and/or cermet part;
(c) cold isostatic pressing the encapsulated three-dimensional metal, ceramic, and/or cermet part with pressurized incompressible fluid that contacts the conformable fugitive material; and
(d) removing the conformable fugitive material from the encapsulated three-dimensional metal, ceramic, and/or cermet part after compressing the encapsulated three-dimensional metal, ceramic, and/or cermet part, wherein the conformable fugitive material removed from the encapsulated three-dimensional metal, ceramic, and/or cermet part is collected and used for encapsulating a newly formed three-dimensional metal, ceramic, and/or cermet part in the conformable fugitive material.

* * * * *